March 22, 1966 W. F. WOLFNER II 3,242,268
DICTATION APPARATUS
Filed Dec. 1, 1961 8 Sheets-Sheet 1

INVENTOR
William Fremont Wolfner, II
BY
Curtis Morris + Safford
ATTORNEYS

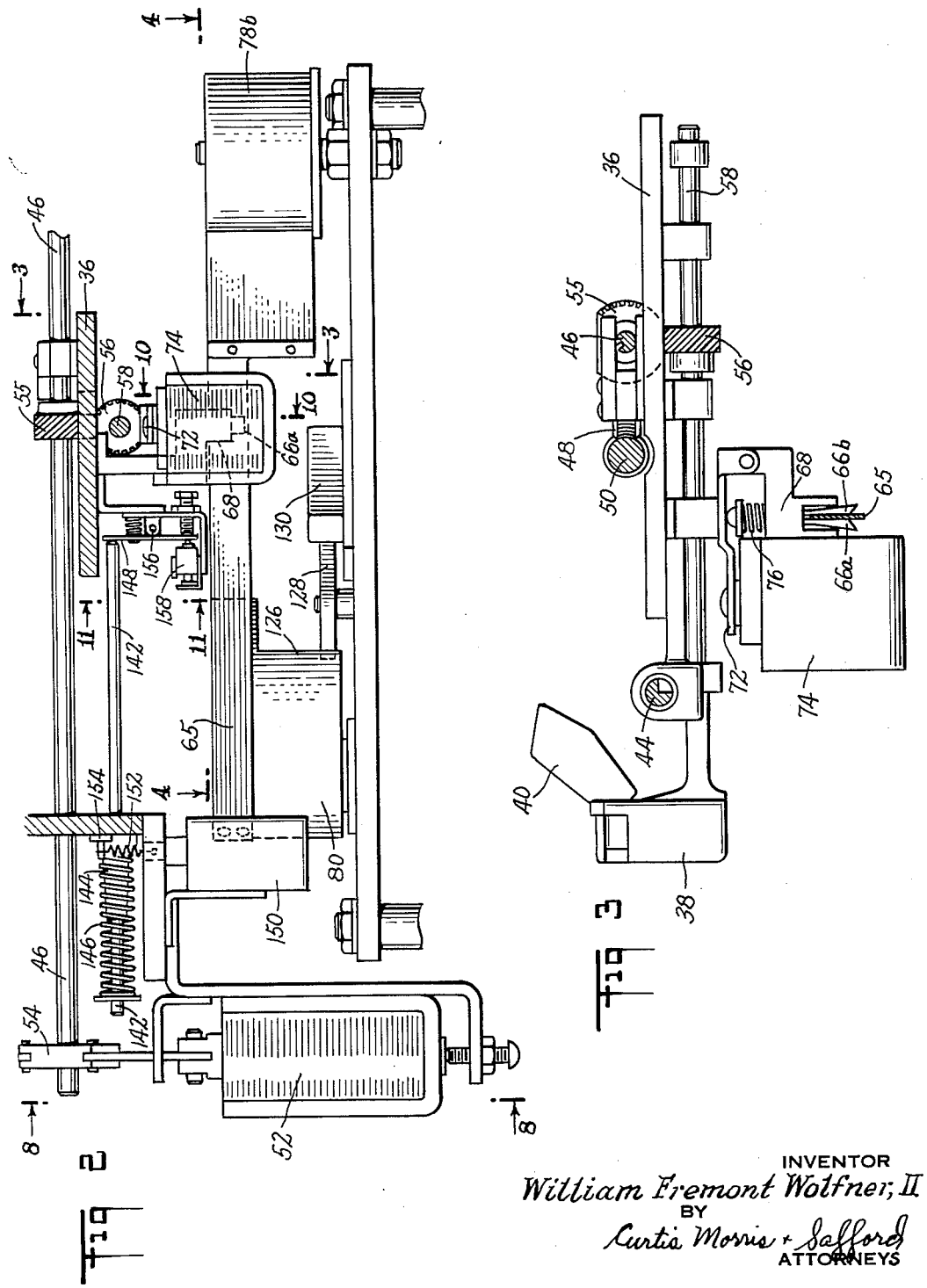

March 22, 1966 W. F. WOLFNER II 3,242,268
DICTATION APPARATUS
Filed Dec. 1, 1961 8 Sheets-Sheet 3
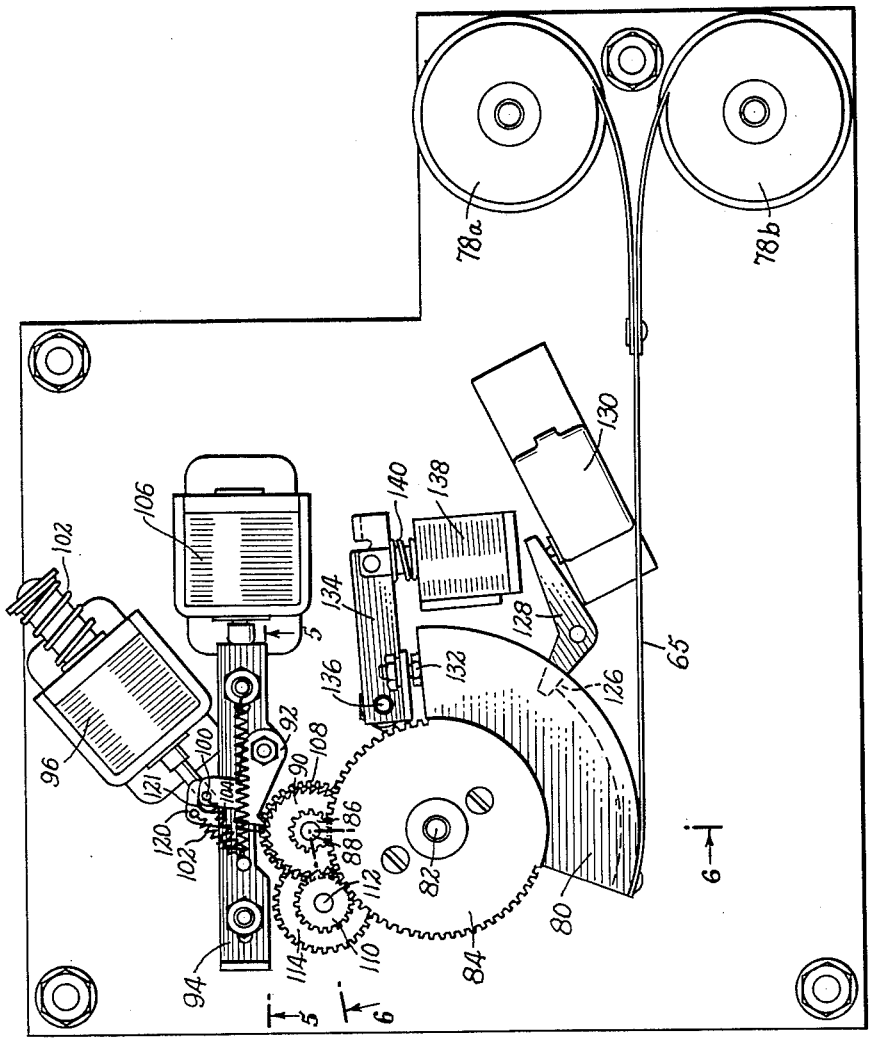
INVENTOR
*William Fremont Wolfner, II*
BY
*Curtis Morris + Safford*
ATTORNEYS INVENTOR
William Fremont Wolfner II
BY
Curtis, Morris & Safford
ATTORNEYS

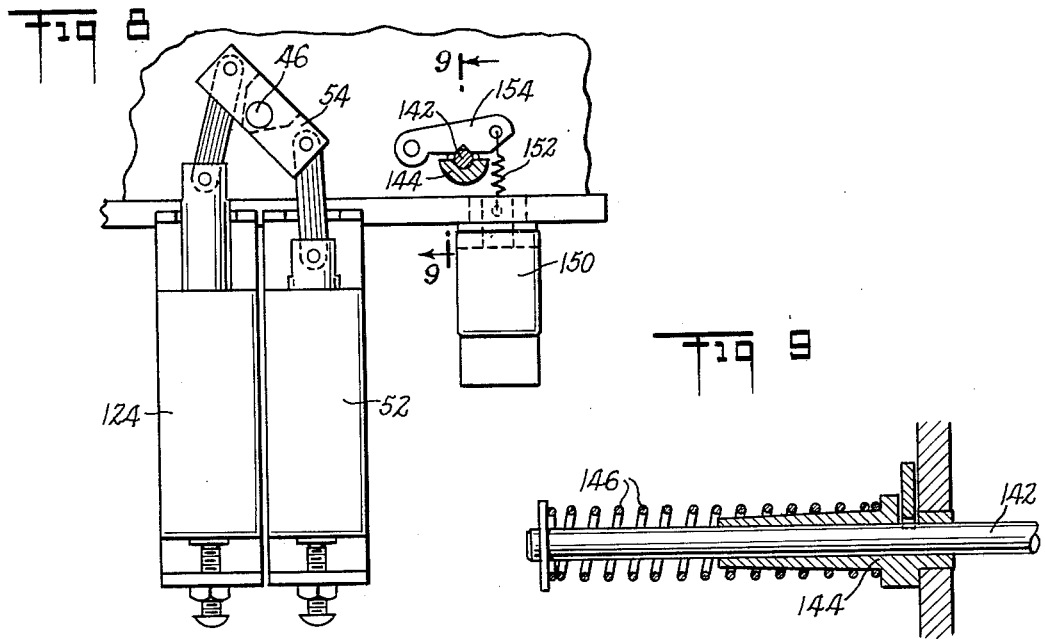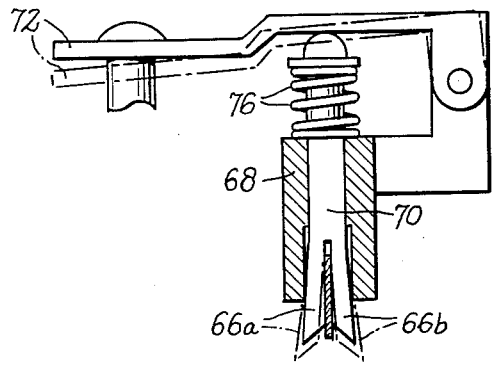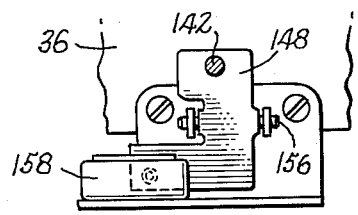

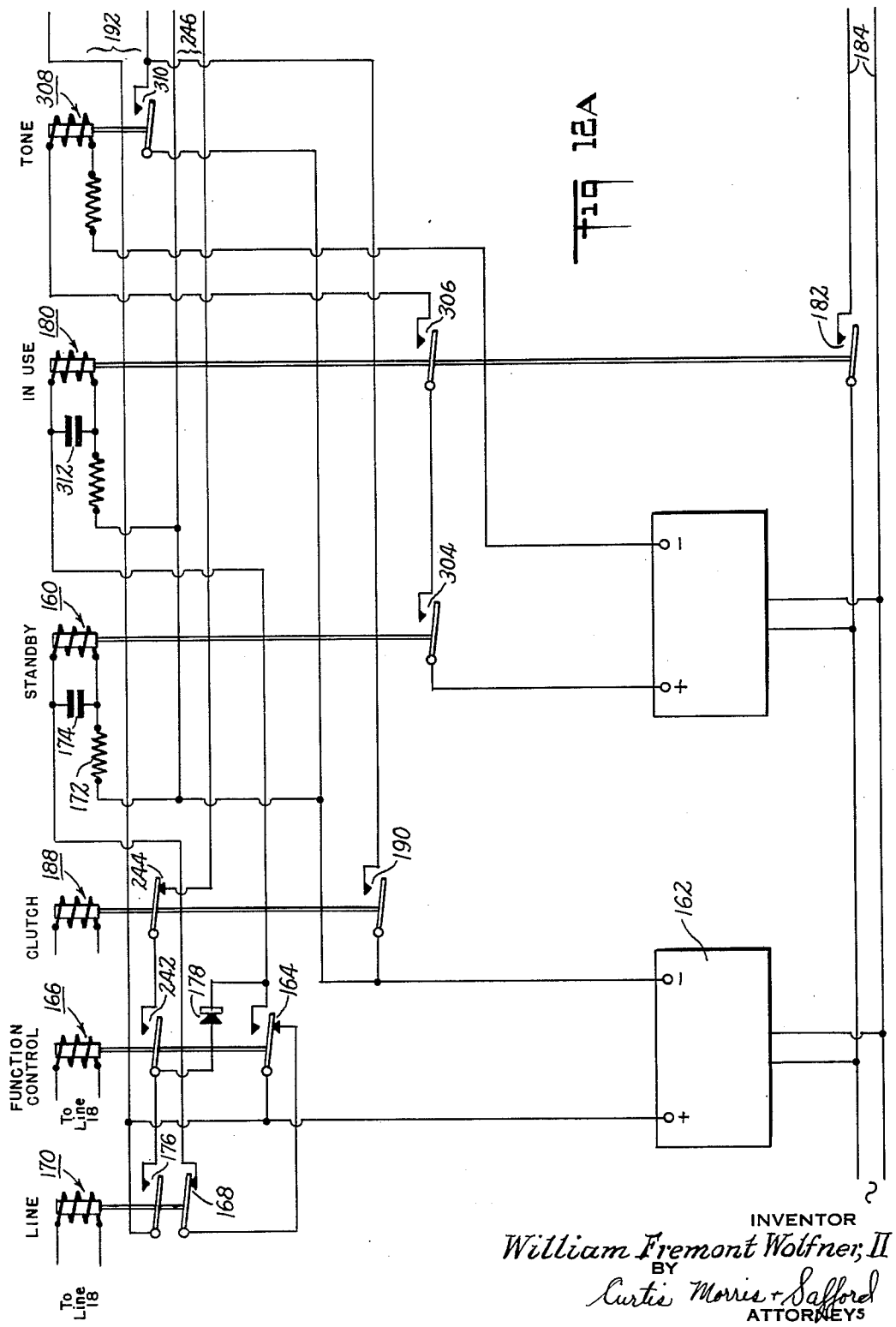

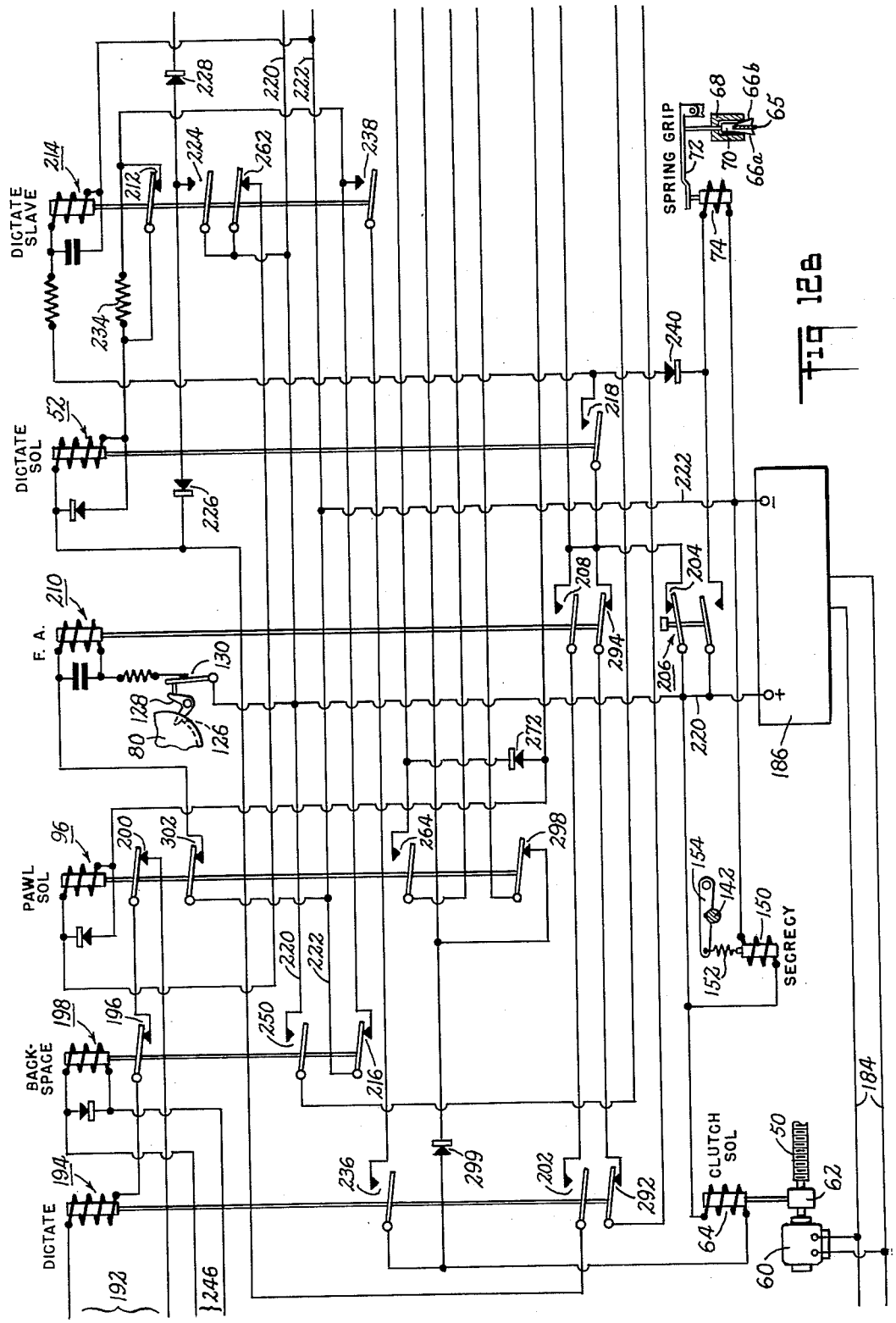

United States Patent Office 3,242,268
Patented Mar. 22, 1966

3,242,268
DICTATION APPARATUS
William F. Wolfner II, Milford, Conn., assignor to
Dictaphone Corporation, Bridgeport, Conn.
Filed Dec. 1, 1961, Ser. No. 156,417
29 Claims. (Cl. 179—100.1)

This invention relates to dictation apparatus, and is particularly applicable to remotely-operated dictation systems wherein a number of dictators have access to a centrally-located dictation machine. A dictation system of this general type is shown in U.S. Patent 2,882,346.

Such remote-dictation systems typically include a plurality of telephone-type dictator's instruments which are connected, in parallel, through a four-wire line leading to the dictation machine. The equipment is so arranged that the first dictator to lift up his handset takes control of the system, and all other dictators are excluded until the first dictator hangs up. A dictator using the system can control various functions of the dictating machine, e.g. he can operate the machine clutch, make "length of letter" and "correction" marks on the usual index pad, and signal the attendant to change the record, etc.

In most remote-dictation systems now in use, provision also is made to enable the dictator to listen back to the last few words recorded, so that he can return to his train of thoughts after an interruption. To provide this so-called "quick review" feature, the reproduce head typically is located in a trailing position with respect to the recording head. Thus, by disengaging the recording head from the record and driving the carriage forward, the reproduce head will pick up the last portion of recorded material, e.g. the last groove or so on the usual plastic belt or disc records.

In such systems there ordinarily is no facility for remotely backspacing the carriage, and thus the dictator cannot listen back to recorded material which has been passed by the reproduce head, without signalling the attendant and asking her to move the carriage back to the desired recorded material. It has, of course, been recognized as desirable to provide the dictator with means for remotely backspacing the carriage, and various means have been suggested from time to time. However, none of these proposals has provided a fully satisfactory system because they have not solved certain practical problems. For example, to add the backspacing function to the other functions normally provided requires the transmission of an additional control signal to the dictating machine, and the presently-used techniques do not provide a practical way of obtaining such additional control over the standard four-wire line connected to the dictator's instruments. The additional control function could be obtained by using a five-wire line, but this would not only raise the cost of the installation but also would make the new equipment incompatible with present installations.

An additional problem is encountered in providing a suitable remotely-controllable drive for the carriage. This drive must be capable of rapid backspacing, and preferably should be arranged to permit the dictator to "spot check" the record at will while backspacing so that he can easily and quickly locate the desired part of the recorded material. Also, after the dictator has located and played back the desired material, the mechanism must be capable of returning the carriage rapidly to the point where recording was interrupted, i.e. the "point of farthest advance," so that the dictator can resume his dictation without undue loss of time. It also is desirable to provide improved means for limiting the backspacing movement, i.e. to assure that a dictator cannot play back a recording made by a previous dictator.

In an embodiment of the present invention described herein, there is provided a four-wire remote-dictation system having all of the normal controls and, in addition, facility for backspacing the carriage by pressing a "playback" button at the remote instrument. The desired backspacing function is obtained in a unique manner by clamping the carriage to a flexible metal band which then is drawn to the rear by a rotatable drum to which the band is fastened. The drum is rotated one increment each time the dictator presses his playback button, so that the carriage moves back in a step-by-step movement. If the dictator releases his playback button for a period longer than about 2 seconds, means are automatically operable to switch the machine to "listen" condition, wherein the carriage is driven forward at normal speed by the usual feed screw, and the material then under the reproduce head is played back to the dictator's ear piece. These latter means avoid the need for a separate control to condition the machine for reproducing, and yet achieves the desired results in a simple and reliable manner. Ultimately, when the carriage reaches the point of farthest advance, i.e. where recording had previously ceased, the carriage is automatically stopped and the machine is switched to "neutral" condition. Thereafter, the dictator can resume dictation in the normal way.

Accordingly, it is an object of this invention to provide improved dictation apparatus. Another object of this invention is to provide a superior backspacing mechanism particularly adapted for use in a remote-dictation system. Still another object of this invention is to provide a unique control arrangement wherein a backspacing movement of the carriage can be effected over a conventional four-wire line along with the usual additional control functions associated with a remote-dictation system. Other objects, aspects and advantages of this invention will in part be apparent from, and in part pointed out in, the following description considered together with the accompanying drawings, in which:

FIGURE 2 is a vertical section taken along line 2—2 of FIGURE 1;

FIGURE 3 is a cross-section taken along line 3—3 of FIGURE 2, particularly showing the machine carriage;

FIGURE 4 is a horizontal section taken along line 4—4 of FIGURE 2, to show the layout of the backspacing mechanism;

FIGURE 8 is a cross-section taken along line 8—8 of FIGURE 2, showing certain control solenoids;

FIGURE 9 is a detail section taken along line 9—9 of FIGURE 8, showing the mounting of the secrecy rod;

FIGURE 10 is a detail view taken along line 10—10 of FIGURE 2, showing the carriage clamp device;

FIGURE 11 is a detail view taken along line 11—11 of FIGURE 2, showing the switch mechanism for limiting the backspacing movement; and FIGURES 12A, 12B and 12C represent a composite circuit diagram of the control circuits for the dictation system.

Figure 1:
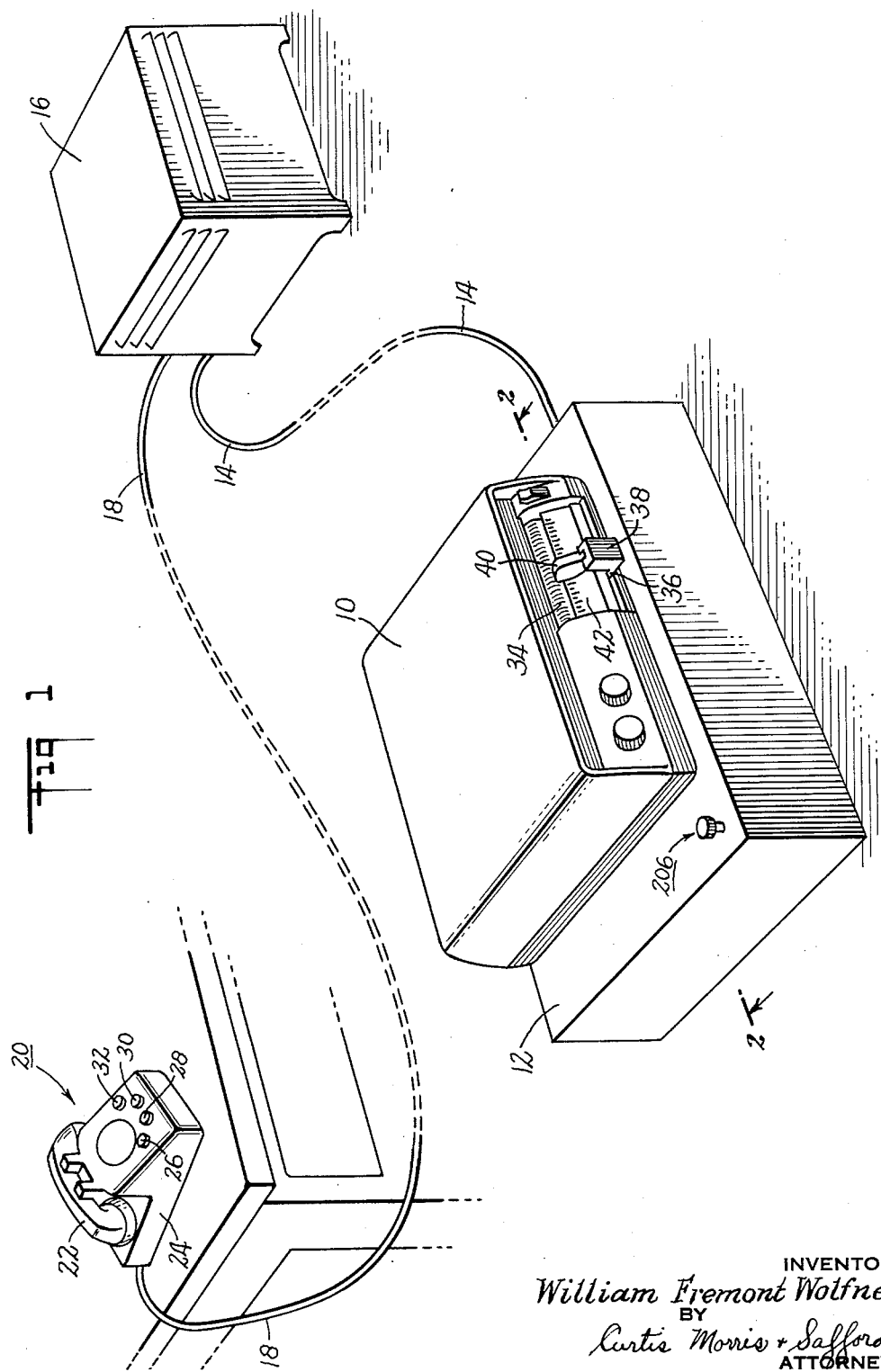
FIGURE 1 shows the basic components of a remote-dictation system including apparatus in accordance with the present invention.

Referring now to FIGURE 1, there is shown the principal components of a remote dictation system comprising a dictating machine 10 mounted on a console 12 containing certain operating elements for backspacing the dictating machine as will be described. The console 12 is connected by a cable 14 to a relay control unit 16 which normally is located nearby. The control unit, in turn, is connected by a four-wire line 18 to a plurality of remotely-located dictator's instruments 20, only one of which is shown herein in order to simplify the drawings. Each dictator's instrument comprises a telephone handset 22 carried in the usual cradle on a base 24 having four pushbuttons 26–32 for controlling the operation of the dictating machine.

The dictating machine 10 is conventional in most respects, and includes a belt record 34 mounted for rotation on a pair of cylindrical mandrels, e.g. as shown in copending application Serial No. 728,646, now U.S. Patent No. 3,056,606, filed on April 15, 1958, by Frederick W. Schueler et al. Beneath the record 34 is a carriage 36 (FIGURES 2 and 3) carrying the usual recording and reproduce heads (not shown) which engage the record 34. A control arm 38, integral with this carriage, extends out to the front of the machine 10, and is provided with a conventional index device 40 carrying means for making marks (e.g. to indicate "correction" or "length of letter") on an index pad 42. The carriage 36 is slidably mounted on two rods 44 and 46, and includes a feednut 48 adapted for driving engagement with the usual feedscrew 50 for the purpose of traversing the recording and reproduce heads laterally with respect to the belt record 34.

In the following description, the mechanical operation of the apparatus will first be explained, and thereafter the electrical circuits for controlling these operations will be described.

Mechanical operation

To start dictation, the handset 22 first is removed from its cradle to establish connection to the control unit 16 through the four-wire line 18. This actuates various relays in the control unit, as will be described hereinafter, and these relays, in turn, supply an energizing signal through cable 14 to actuate a Dictate solenoid 52 (FIGURES 2 and 8). The armature of this solenoid is connected to one end of a link 54 which is secured to the carriage rod 46. When the dictation system is not in use, link 54 is held horizontal by springs, but when solenoid 52 is actuated this link and control rod 46 are rotated clockwise, as seen in FIGURE 8.

The rotation of rod 46 is transmitted through gears 55, 56 to a control shaft 58 mounted on carriage 36. Gear 55 is keyed to a slot in rod 46, and is carried along with the carriage by means abutting the sides of the gear. Details of the control shaft 58 are shown in the above-mentioned Schueler et al. application (see reference numeral 232 therein), but for the purposes of the present invention it will be sufficient to understand that this shaft operates cams to control the movement of the recording and reproduce heads into and out of engagement with the record 34 and to control the engagement of the feednut 48 with the feedscrew 50. When shaft 58 is rotated by actuation of the Dictate solenoid 52, the feednut is engaged and the recording and reproduce heads both are placed in contact with the record.

Figure 12C:
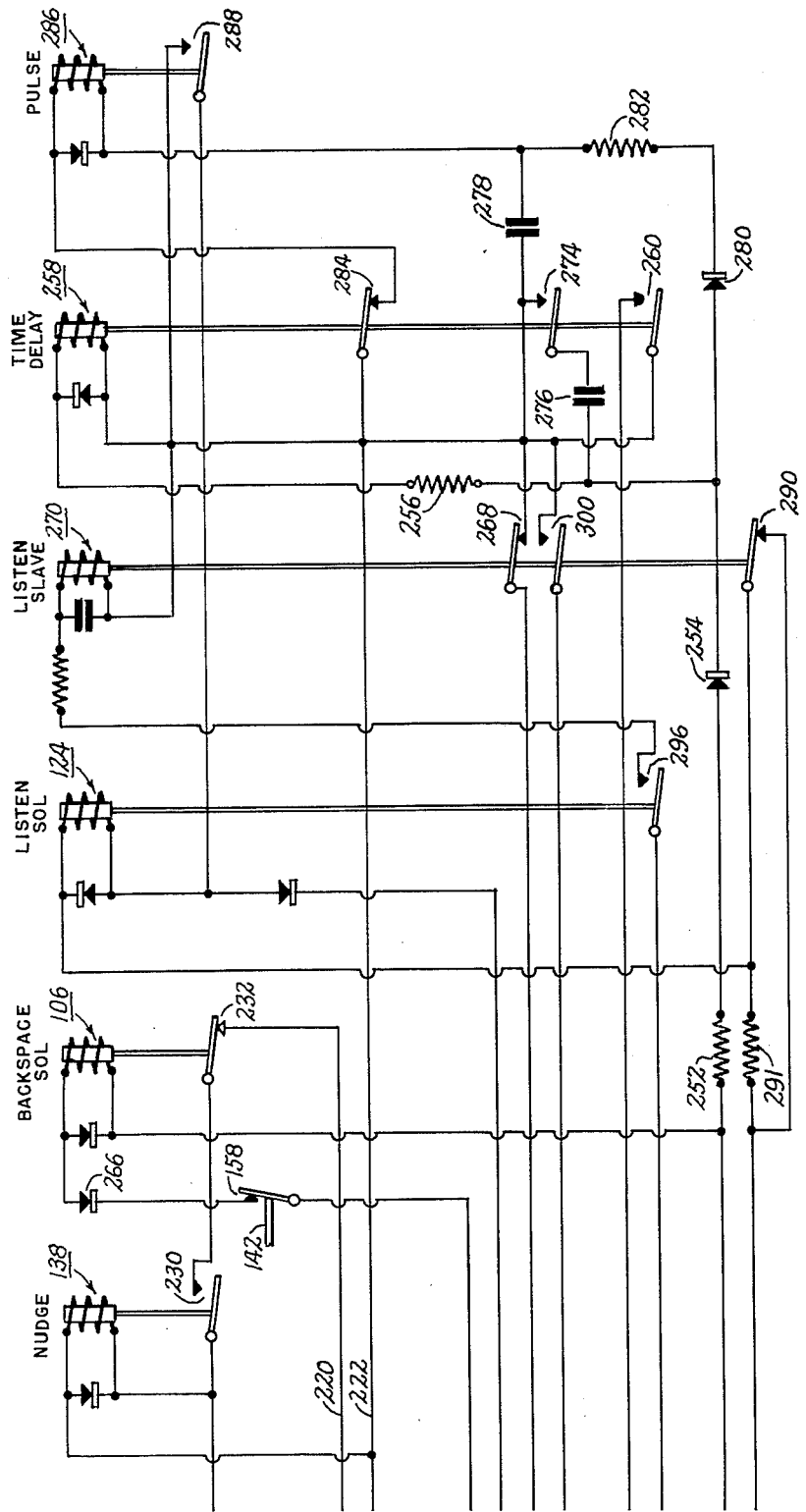

The feedscrew 50 and the mandrels for the record 34 are driven by a motor 60 (see the lower left-hand corner of FIGURE 12B) through the usual clutch 62. When a dictator seizes control of the system by picking up his handset 22, electric power is connected to this motor which continues to run until the system is again idle. In addition, as will be explained, when the dictator first picks up his handset, the clutch solenoid 64 is momentarily energized to rotate the record 34 about 1.5 revolutions and correspondingly to advance the carriage 36. This movement provides an isolating "guard band" of blank record space between the material placed on the record by different dictators. A similar advance of about 1.5 revolutions is made when the dictator hangs up, to provide a total guard band of 3 revolutions.

To commence dictation, the dictator merely presses the usual record button on his handset 22, and the clutch 62 is engaged to start the record 34 rotating and the carriage 36 moving transversely across the face of the record. The dictator speaks into the microphone of his handset, and the words are recorded in the normal way. When there is a pause in dictation, the record button on the handset may be released to stop the record and the carriage, but the Dictate solenoid 52 remains actuated and the dictator retains control of the system.

If the dictator desires to listen back to any material that he has dictated, he need only release the record button and press the "playback" button 26 on the instrument base 24. Circuit means are thereby operated to deenergize the Dictate solenoid 52, so as to return the machine 10 to its "neutral" condition with the feedscrew disengaged and the recording and reproduce heads out of contact with the record 34. Thus the carriage now is free to be backspaced for the purpose of playing back previously recorded material.

This backspacing movement of the carriage 36 is achieved by a mechanism including a flexible metal towing strip 65 (FIGURES 2 and 3) to which the carriage is clamped when the machine is placed in neutral condition. For this purpose, there are provided adjacent the sides of strip 65 a pair of tapered gripping wedges 66a, 66b (see also FIGURE 10) which are mounted in a slideway formed in a support member 68 attached to the carriage. These wedges are integral with a slide 70, and are movable a small distance towards and away from each other as shown (exaggerated) in the drawing. When the machine is in "dictate" condition, the slide is held in its lowermost position by an arm 72 which is pulled down by a Gripper solenoid 74 (FIGURES 2 and 3), so that the wedges 66a, 66b will spring out of gripping engagement with the strip 65. When the machine is returned to neutral condition, the solenoid 74 is deenergized, and a spring 76 pulls the slide 70 up so that the wedges are jammed tightly against the strip. In this way the carriage is clamped to the strip 65.

As shown in FIGURE 4, the towing strip 65 is fastened at its right-hand end to a pair of "negator" springs 78a, 78b, which provide essentially constant tension regardless of the degree to which the springs are extended. The left-hand end of the strip is secured to the periphery of a drum segment 80 which is mounted for rotation about an axis 82. As will be explained in more detail, each time the dictator presses his playback button 26, this drum is rotated a fixed increment in a clockwise direction to pull the carriage 36 back a corresponding amount transversely with respect to the record 34.

Figure 5:
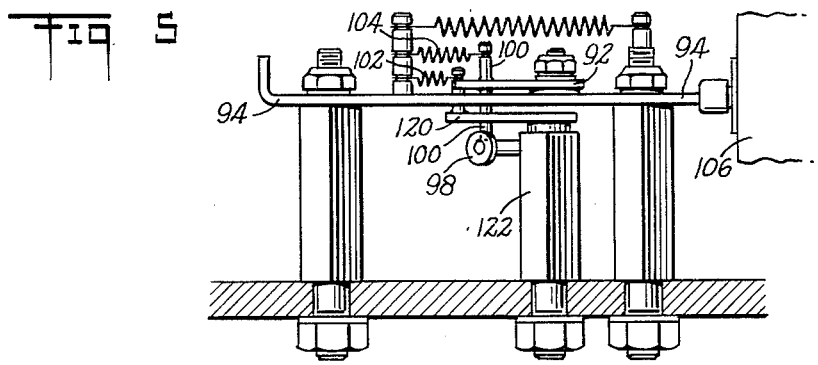
FIGURE 5 is a section taken along line 5—5 of FIGURE 4 to show the pawl and slide arrangement.
Figure 6:
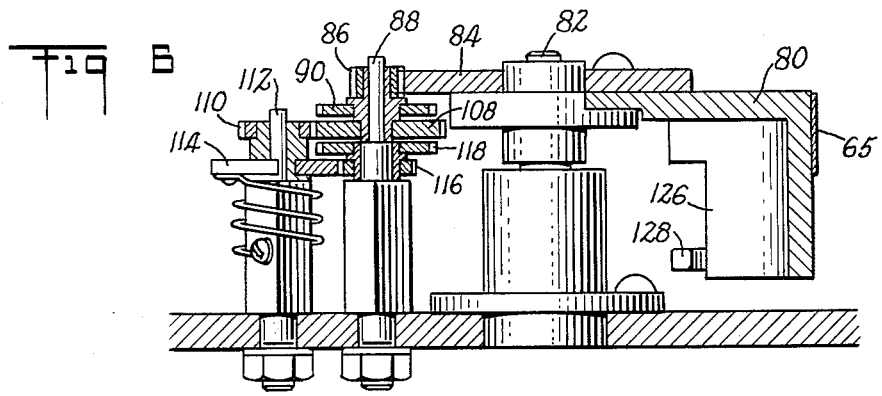
FIGURE 6 is a section taken along line 6—6 of FIGURE 4, particularly showing the gear connections for the pawl drive.
Figure 7:
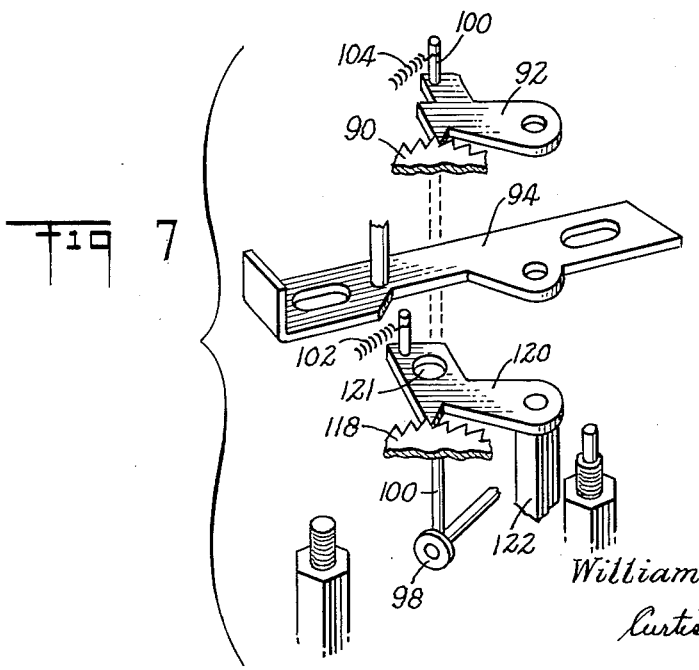
FIGURE 7 is an exploded perspective view showing aspects of the pawl drive mechanism.

Referring now to FIGURES 5, 6 and 7, the backspacing drive mechanism includes a toothed drive ring 84 integral with the top of drum 80 and engaged with a gear 86 rotatably mounted on a spindle 88. Carried with gear 86 is a pawl wheel 90 engageable with a drive pawl 92 mounted on a slide 94. When the machine 10 is in "dictate" condition, pawl 92 is held away from wheel 90 by a Pawl solenoid 96 (FIGURE 4), the armature of which carries a small disc 98 arranged to latch back a pin 100 passing through the pawl. When the machine is shifted to "neutral" condition preparatory to a backspacing operation, the Pawl solenoid is energized, and its armature moves outwardly to shift the disc 98 away from pin 100 to permit pawl 92 to be drawn into engagement with wheel 90 by a pawl spring 104.

Immediately after pawl 92 has engaged the teeth of pawl wheel 90, a Backspace solenoid 106 is actuated to shift slide 94 to the left a fixed distance. Thus pawl 92, which is carried by this slide, turns pawl wheel 90 so as to rotate drum 80 and pull the strip 65 to the left. Since, as described hereinabove, this strip now is secured to the carriage 36 by the wedges 66a, 66b, the carriage is backspaced one increment with respect to the record 34.

Pawl wheel 90 also carries a gear 108 which meshes with a companion gear 110 mounted on a spindle 112. Integral with the latter gear 110 is a larger diameter gear 114 meshing with a small gear 116 on a spindle 88, and carrying a second pawl wheel 118. This wheel is engageable with a restraining pawl 120 pivotally mounted on a fixed pedestal 122, and which is urged by spring 102 against wheel 118 to prevent reverse movement of the pawl wheels. The gear connections between the two pawl wheels are so arranged that the second wheel 118 moves four teeth for every tooth moved by the first wheel 90. This gearing-down arrangement assures reliable operation of the backspacer, since if the restraining pawl misses one tooth on wheel 118, the slipback of wheel 90 will be only 25% of the forward movement. Pin 100 passes through a hole 121 in pawl 120, so that this pawl will be disengaged from its pawl wheel whenever Pawl solenoid 96 is deenergized.

When the dictator releases his playback button 26, the Backspace solenoid 106 is de-actuated and the drive pawl 92 is pulled back one tooth with respect to the pawl wheel 90. If the playback button 26 is again pressed, the Backspace solenoid will be reactuated to backspace the carriage 36 another increment. Thus the carriage can be backed up in a step-by-step manner until the desired part of the dictated material has been reached.

If the dictator does not repress the playback button 26 for a period of about 2 seconds after its release, the Pawl solenoid 96 is automatically deenergized so as to release the pawl wheels 90 and 118. At the same time, circuit means become operative to energize a Listen solenoid 124 (FIGURE 8) which rotates the carriage rod 46 counterclockwise and, through gears 55 and 56, correspondingly rotates control shaft 58 on the carriage 36. As explained in the above-mentioned Schueler et al. application, this places the dictating machine 10 in "listen" condition wherein the feednut 48 is engaged with the feedscrew 50, the reproducing head is in contact with the record 34, and the recording head is out of contact with the record. The clutch 62 (FIGURE 12B) also is actuated, so that the carriage 36 is driven forward and the record 34 rotates to play back the previously recorded material to the earpiece in the dictator's handset 22.

If the dictating machine is left in "listen" condition, the carriage 36 will continue to advance, pulling with it the drum 80, until the carriage reaches its point of farthest advance where a finger 126 (FIGURES 4 and 6) on the drum strikes a bellcrank 128 to operate a limit switch 130. This switch energizes circuit means to cause the machine to revert to "neutral" condition and the carriage motion stops. Thereafter the dictator may repress the record button on his handset to condition the machine for further dictation as previously described.

In many cases, a dictator will not wish to listen to all of the recorded material up to the point of farthest advance. Therefore, means are provided which operate, when the dictator presses his record button with the machine in "listen" condition, to automatically release the feednut 48 from the feedscrew 50. Thus the carriage 36 is freed to be pulled back rapidly to the point of farthest advance by the negator springs 78a, 78b, where the switch 130 will be operated to place the machine in "neutral" condition. This forward movement of the carriage is quite rapid, so that the dictator is enabled quickly to resume his dictation by again pressing the record button to place the machine in "dictate" condition.

Since the rotational position of the record 34 will, when dictation is resumed, very likely be different from its position at the time the backspacing movement commenced, it is necessary to bring the carriage back to a point slightly beyond the point of farthest advance, e.g. by a distance equal to one groove on the record 34, for otherwise the additional dictation might be recorded on top of some previous dictation. This repositioning of the carriage is achieved by offsetting the drum 80 a small amount prior to the backspacing movement, i.e. before the wedges 66a, 66b grip the strip 65, so that when the drum ultimately returns to its normal rest position, the strip will stop at a position slightly beyond the position it occupied at the time the carriage 36 was locked to the strip.

In more detail, it will be seen in FIGURE 4 that counterclockwise rotation of the drum 80 is limited by a stop nut 132 carried on an arm 134 pivoted at 136. When the dictating machine 10 is placed in "dictate" condition as described above, arm 134 is rotated a small amount clockwise by a Nudge solenoid 138, and the resulting movement of stop nut 132 correspondingly rotates drum 80 clockwise to shift the strip 65 slightly to the left. When the machine is to be backspaced, the wedges 66a, 66b are pulled up to grip the strip 65 in its offset position, and the drum is rotated clockwise in a step-by-step movement by Backspace solenoid 106 operating through the pawl drive mechanism connected thereto. At the same time that the wedges 66a, 66b are locked to the strip 65, the Nudge solenoid 138 is deenergized so that arm 134 is rotated counterclockwise by a spring 140 to return the stop nut 132 to its normal limit position. When the carriage 36 subsequently is driven forward during the playback operation (or is pulled forward by springs 78a, 78b at the end of playback), the drum 80 will rotate correspondingly and ultimately stop in a position slightly beyond its initial position because the stop nut 132 is no longer in its offset location. Thus the carriage will come to rest in a position slightly beyond its position at the time backspacing was started.

Since a number of dictators will have access to the same dictating machine 10, it is desirable to provide "secrecy" means to assure that a dictator operating the machine cannot listen back to material recorded by a previous dictator. For this purpose, as shown in FIGURES 2 and 9, the machine includes a secrecy rod 142 which is supported by a bushing 144 for longitudinal movement behind the carriage 36. This rod is urged to the right by a spring 146 and, while the dictation system is idle, presses against a switch arm 148 mounted on the carriage. When a dictator lifts up his handset 22 to seize control of the system, circuit means become operative to energize a Secrecy solenoid 150 (see also FIGURE 8) the armature of which is connected through a spring 152 to a pivotal locking lever 154. Actuation of solenoid 150 applies a downward force to lever 154 which frictionally engages the secrecy rod 142 to prevent any movement thereof while the carriage 36 subsequently is driven forward during dictation. Thus the rod 142 remains in its initial position during the dictation operations.

If the dictator subsequently desires to listen back to his recorded material, as previously described the carriage 36 will be backspaced a fixed increment each time the playback button 26 is pressed. If the carriage is backed up to the position it occupied at the start of dictation, the switch arm 148 mounted on the carriage will strike the secrecy rod 142. This switch arm, which is pivoted at 156, is arranged upon contact with rod 142 to actuate a switch 158 which operates circuit means to disable the backspacing mechanism. Accordingly, the carriage cannot be backspaced beyond its initial position, i.e. the position of previous farthest advance, so that the material placed on the record 34 by the previous dictator cannot be played back to the current dictator.

*Electrical operation*

Referring now to FIGURE 12A, which is a simplified schematic diagram of the relay circuits in the control unit 16, when the dictation system is idle all of the relays are deenergized with the exception of a standby relay 160. This standby relay is energized from a D.-C. power supply 162, the circuit being traced from the positive terminal of this power supply through contacts 164 of a function control relay 166, contacts 168 of a line relay 170, and through the standby relay winding and a resistor 172 to the negative terminal of the power supply. This relay winding also is provided with a capacitor 174 to prevent the relay from dropping out for 1.5 to 2 seconds after its deenergization.

When a dictator removes his handset 22 from the telephone cradle, the line relay 170 will be energized. The circuit by which the line relay is energized is described in U.S. Patent 2,882,346, and in itself forms no part of the present invention. Contacts 176 of this line relay close to complete an energizing circuit through a rectifier 178 to the winding of an "in-use" relay 180. Contacts 182 of the in-use relay thereupon close to complete an A.-C. power circuit through leads 184 to the drive motor 60 (FIGURE 12B) and to a rectifier power supply 186 which furnishes D.-C. power to the relays in the backspace console 12 (FIGURE 1).

To start dictation, the dictator presses the record button on his handset 22. This button controls a circuit which, as described in the above-mentioned Patent 2,882,346, energizes a clutch relay 188 (FIGURE 12A). Contacts 190 of the clutch relay close to activate a D.-C. energizing circuit 192.

Referring now to FIGURE 12B, the D.-C. power of circuit 192 is applied to the winding of a "dictate" relay 194 through contacts 196 of a backspace relay 198 and contacts 200 of the Pawl solenoid 96. When the dictate relay pulls in, its contacts 202 close to complete an energizing circuit to the Dictate solenoid 52. This energizing circuit can be traced from the positive terminal of power supply 186 through contacts 204 of a manually operable "change belt" switch 206, through contacts 208 of a farthest advance relay 210 (now energized), dictate relay contacts 202, the winding of the Dictate solenoid, contacts 212 of a dictate slave relay 214 and back through contacts 216 of the backspace relay 198 to the negative terminal of the power supply 186. The Dictate solenoid 52 thereupon is actuated and, as explained hereinabove, conditions the machine for recording operations.

Contacts 218 of the Dictate solenoid also are closed to complete an energizing circuit from the positive bus 220 through the winding of the dictate slave relay 214 and back to the negative bus 222. Contacts 224 of this latter relay close to complete a lock-up circuit for the Dictate solenoid, this circuit passing through a rectifier 226 to the solenoid winding. The latter contacts also supply current through another rectifier 228 to the Nudge solenoid 138 (FIGURE 12C) which, as previously described, rotates the drum 80 a small amount to condition the machine for a subsequent backspacing operation. The Nudge solenoid is locked up by its contacts 230, the circuit passing through contacts 232 of the Backspace solenoid 106. Contacts 212 of the dictate slave relay 214 also open to place a resistor 234 in series with the winding of the Dictate solenoid 52, in order to reduce the current being supplied to this solenoid.

Energization of the dictate relay 194 energizes the Clutch solenoid 64, the circuit being traced from positive bus 220 to the solenoid winding, through contacts 236 of the dictate relay, contacts 238 of the dictate slave relay 214, and contacts 216 of the backspace relay 198 to the negative bus 222. Thus, as long as the record button on the handset 22 is held down so that the dictate relay is energized, the machine will be conditioned for recording operations, and the Clutch solenoid will be actuated so that the feed screw 50 will advance the carriage 36 with respect to the record 34.

Closure of contacts 218 of the Dictate solenoid 52 also completes an energizing circuit through a rectifier 240 to the winding of the Gripper solenoid 74. Therefore, this solenoid is energized and the gripper wedges 66a, 66b are released from the metal strip 65 secured to the drum 80. Accordingly, the carriage 36 is free to move with respect to this strip which remains stationary after it has been shifted a small distance by the Nudge solenoid 138. When the dictator releases the record button, the dictate relay 194 drops out to deenergize the Clutch solenoid 64 so that the carriage stops. However, the Dictate solenoid 52 remains energized through the lock-up circuit previously described, so that the machine is retained in "dictate" condition.

To backspace the carriage, the dictator presses the playback button 26 on the instrument base 24. Reverting now to FIGURE 12A, actuation of this playback button serves, in a manner explained in the above Patent 2,882,346, to energize the function control relay 166 (corresponding to the "control relay 238" shown in that patent) from current flowing through two of the wires in the four-wire line 18. Contacts 242 of the function control relay close to supply power through contacts 244 of the clutch relay 188 (now deenergized) to a backspace energizing circuit 246. Referring now to FIGURE 12B, this circuit 246 energizes the backspace relay 198, the contacts 216 of which open to interrupt the lock-up circuit for the Dictate solenoid 52. This latter solenoid thereupon drops out, to place the dictating machine 10 in "neutral" condition.

When the Dictate solenoid 52 is denergized, its contacts 218 open to break the energizing circuit for the dictate slave relay 214. Since these contacts 218 also supply current to the Gripper solenoid 74, this solenoid is deenergized so that the wedges 66a, 66b are jammed against the strip 65 to clamp the carriage 36 thereto.

When the backspace relay 198 pulls in, its contacts 250 close to complete a circuit from the positive bus 220, through a resistor 252, a rectifier 254, and another resistor 256 to the winding of a time delay relay 258. This relay pulls in, and its contacts 260 close to complete an energizing circuit for the Pawl solenoid 96, this circuit passing through contacts 262 of the dictate slave relay 214 (now deenergized). The Pawl solenoid thus is actuated, and its contacts 264 close to apply power to the Backspace solenoid 106, the circuit being traced from positive bus 220, contacts 250 of the backspace relay 198, the Backspace solenoid winding, a rectifier 266, the secrecy switch 158, Pawl solenoid contacts 264 and contacts 268 of a "listen slave relay" 270. Closure of Pawl solenoid contacts 264 also completes a lock-up circuit for the Pawl solenoid, this circuit passing through a rectifier 272 and contacts 268 of relay 270.

As explained hereinabove, operation of the Pawl solenoid 96 permits the pawls 92 and 120 (FIGURE 7) to be moved by their respective springs into engagement with the corresponding pawl wheels 90 and 118. Thereafter, actuation of the Backspace solenoid 106 shifts pawl 92 so as to rotate drum 80 and pull the carriage 36 back a predetermined increment or "step" with respect to the record 34.

When the time delay relay 258 is actuated in response to operation of the playback button 26, as described above, its contacts 274 close to charge up a capacitor 276, the positively charged plate of which is connected through resistor 256 to the relay winding. Simultaneously, a second capacitor 278 is charged up from the relay energizing circuit, the charging current passing through a rectifier 280 and a resistor 282. When the playback button 26 is released, the Backspace solenoid 106 will be deactuated (because backspace relay 198 is denergized), but the time delay relay will, for a period of about 2 seconds, be maintained actuated by current from capacitor 276, and no change occurs to the machine condition. If the playback button 26 is re-pressed during this 2-second period, the Backspace solenoid 106 will be reactuated, and thus the carriage will be pulled back an additional increment with respect to the record 34.

If the playback button 26 is not re-pressed within about 2 seconds after its release, the time delay relay 258 will drop out, and its contacts 284 will close to connect capacitor 278 (now fully charged) to the winding of a pulse relay 286. Contacts 288 of this relay thereupon close momentarily to connect the negative bus 222 to the winding of the Listen solenoid 124. This pulls in the Listen solenoid, since the other terminal of its winding is connected to the positive bus 220 through a circuit including contacts 290 of the listen slave relay 270, contacts 292 of the dictate relay 194, contacts 294 of the farthest advance relay 210 (now deenergized because farthest advance switch 130 opened at the first backspacing step), and contacts 204 of the manually-operable "change-record" switch 206. When the Listen solenoid is actuated, the dictating machine is placed in "listen" condition, i.e. wherein the feednut 48 is engaged with the feedscrew 50, the reproduce head is in contact with the record 34 and the recording head out of contact therewith, and the amplifier circuitry is switched so as to amplify the sound signals picked up by the reproduce head.

At the same time, contacts 296 of the Listen solenoid close and pull in the listen slave relay 270, the contacts 268 of which open to break the lock-up circuit for the Pawl solenoid 96. When the Pawl solenoid 96 drops out, the pawls 92 and 120 (FIGURE 7) are pulled out of engagement with their pawl wheels, and the drum 80 (FIGURE 4) is free to be rotated counterclockwise as the carriage 36 is driven forward to reproduce the recorded material. Also, contacts 290 of relay 270 open to insert a resistor 291 in series with the Listen solenoid winding, to reduce the current therethrough.

Deactuation of the Pawl solenoid 96 also closes its contacts 298 to complete a lock-up circuit for the Listen solenoid, this circuit passing through contacts 300 of the listen slave relay 270. Thus, when the pulse relay 286 drops out after the capacitor 278 is discharged, the Listen solenoid will be held in. Pawl solenoid contacts 298 also energize the Clutch solenoid 64 through a rectifier 299. If the dictator takes no further action, therefore, the machine will continue to reproduce the previously recorded material until the farthest advance switch 130 (FIGURE 4) is closed by the lever arm 128 when the drum 80 has returned effectively to its initial position. Closure of switch 130 energizes the farthest advance relay 210 (FIGURE 12B), the circuit passing through contacts 302 of Pawl solenoid 96. When the farthest advance relay pulls in, its contacts 294 open to interrupt the lock-up circuit for the Listen solenoid 124. This solenoid thereupon is deactuated, and the machine is returned automatically to "neutral" condition pending further dictation operations.

If the dictator wishes to resume recording before the farthest advance switch 130 has been actuated, he need only press the record button on his handset 22 to energize the dictate relay 194. Contacts 292 of this relay will open to interrupt the lock-up circuit for the Listen solenoid, and the machine will return to "neutral" condition. In this condition, the feednut 48 is disengaged from the feedscrew 50, and therefore the carriage 36 will be pulled back to the position of farthest advance by the negator springs 78a, 78b (FIGURE 4) acting through the strip 65 to which the carriage 36 is secured. When the farthest advance switch 130 is closed, the carriage will be stopped and dictation can be resumed as previously described.

As mentioned previously, whenever, a dictator takes or relinquishes control of the system, the record 34 is rotated about 1.5 revolutions to produce a blank "guard band" between the material record by different dictators. In more detail, and referring now to FIGURE 12A, if a dictator picks up his handset and seizes the system, the standby relay 160 is deenergized and the in-use relay 180 is energized, as explained hereinabove. However, the standby relay does not drop out immediately, i.e. this relay is slow to drop out due to the capacitor 174 connected in parallel with the relay winding. Thus, for a short period of time, standby relay contacts 304 remain closed and complete an energizing circuit through in-use relay contacts 306 to a tone relay 308. This relay includes contacts 310 which parallel clutch relay contacts 190, and therefore, during the momentary operation of the tone relay, the clutch will be actuated to drive the record 34 and the carriage 36.

The in-use relay 180 also is slow to drop out after the dictator hangs up, due to a capacitor 312 connected across the relay winding. For the short period of time delay in drop out, in-use relay contacts 306 will remain closed to energize the tone relay 308 just as when the dictator seized control of the system, and the record and carriage again will be driven forward for about 1.5 revolutions. Thus it will be apparent that a total guard band of about 3 revolutions (grooves) will be developed between the recorded material of different dictators.

As described hereinabove, the present invention provides a number of significant advantages. For example, the dictator is enabled to backspace the machine carriage remotely, in addition to the other control functions normally provided, and this added facility has been achieved without increasing the number of wires connecting the dictators' instruments to the dictating machine. Moreover, the backspacing apparatus is adapted for rapid "scanning" of the recorded material by the dictator, i.e. the dictator can controllably backspace the carriage in a step-by-step movement, and each time he releases the playback button for more than about 2 seconds, the recorded material then under the reproduce head is automatically played back. In this way, the dictator can easily spot check the recording while backspacing, and quickly locate the part in which he is interested. The various facilities described hereinabove have been achieved with an economical construction that affords superior operating characteristics and reliability in use.

Although a preferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

I claim:

1. In a remote-dictation system of the type including a centrally-located recording apparatus connected over a multiwire line to a group of remote dictators' instruments each having control means for controlling current flow through said wires to effect at said recording apparatus selected functions such as backspacing and conditioning the recording apparatus for playing back previously-recorded material; the combination of first circuit means at said recording apparatus to be coupled to said multiwire line and responsive to signals in one of the wires produced by actuation of a corresponding control means at a dictator's instrument, said first circuit means being operable to effect the activation of a first function at said recording apparatus, second circuit means responsive to signals in said one wire produced by the release of said corresponding control means, said second circuit means being operable to effect the activation of a second function at said recording apparatus, means for delaying the operation of said second circuit means for a predetermined time period after release of said corresponding control means; and means for preventing the operation of said second circuit means upon said control means being reactuated within said predetermined time period to effect an additional activation of said first function.

2. In a remote-dictation system of the type including a centrally-located recording apparatus connected over a plurality of wires to a group of remote dictators' instruments each having switch means for controlling current flow through one of said wires to effect at said recording apparatus the functions of backspacing and reproducing previously-recorded material; the combination of first circuit means at said recording apparatus adapted to be coupled to said one wire and responsive to the change in current therein produced by actuation of the corresponding switch at a dictator's instrument, said first circuit means being operable to effect a backspacing function at said recording apparatus, second circuit means responsive to the change in current in said one wire produced by the release of said corresponding switch, said second circuit means being operable to effect a reproducing function at said recording apparatus, means for delaying the activation of said reproducing function for a predetermined time period after release of said corresponding switch; and means for preventing the operation of said reproducing function upon said switch being reactuated within said predetermined time period to obtain additional backspacing movement.

3. In a remote-dictation system of the type including a centrally-located recording and reproducing apparatus connected over a plurality of wires to a group of remote dictators' instruments each having switch means for controlling current flow through said wires to effect at said recording apparatus the functions of backspacing and reproducing previously-recorded material; the combination of relay means at said recording apparatus responsive to the change in current in one of said wires produced by actuation of the corresponding switch at a dictator's instrument, first circuit means controlled by the actuation of said relay means and operable to effect a backspacing function at said recording apparatus, second circuit means responsive to the deactuation of said relay means when said corresponding switch is released, said second circuit means being operable to effect a reproducing function at said recording apparatus, means for delaying the activation of said second circuit means for a predetermined time period after release of said corresponding switch; and means for preventing the operation of said second circuit means upon said switch being reactuated within said predetermined time period to obtain an additional backspacing movement.

4. In a remote-dictation system of the type including a centrally-located recording and reproducing apparatus connected over a plurality of wires to a group of remote dictator's instruments each having switch means for controlling current flow through one of said wires to effect at said recording apparatus the functions of backspacing and reproducing previously-recorded material; the combination of a relay at said recording apparatus connected to said one wire and responsive to signals therein produced by actuation of the corresponding switch at a dictator's instrument, first circuit means controlled by said relay when in one condition to effect a backspacing function at said recording apparatus, second circuit means controlled by said relay when in its other condition to effect a reproducing function at said recording apparatus, and means for delaying the activation of said reproducing function for a predetermined time period after said relay has been shifted to said other condition.

5. In a remote-dictation system of the type including a centrally-located recording and reproducing apparatus connected over a plurality of wires to a group of remote dictator's instruments each having switch means for controlling current flow through one of said wires to effect at said recording apparatus the functions of backspacing and reproducing previously-recorded material; the combination of a relay at said recording apparatus connected to said one wire and responsive to signals therein produced by actuation of the corresponding switch at a dictator's instrument, first circuit means controlled by said relay when in one condition to effect a backspacing function at said recording apparatus, second circuit means controlled by said relay when in its other condition to effect a reproducing function at said recording apparatus, means for delaying the activation of said reproducing function for a predetermined time period after said relay has been shifted to said other condition; and means for preventing the operation of said second circuit means upon said relay being shifted back to said one condition within said predetermined time period.

6. In a remote-dictation system of the type including a centrally-located recording apparatus connected over a plurality of wires to a group of remote dictator's instruments each having control means for controlling current flow through said wires to effect at said recording apparatus selected functions such as backspacing, conditioning the recording apparatus for reproducing previously-recorded material, and the like; the combination of first relay means at said recording apparatus and responsive to signals in one of said wires produced by actuation of a corresponding control means at a dictator's instrument, said first relay means being operable thereby to effect the activation of a first function at said recording apparatus, time delay means for maintaining said first relay means operated for a predetermined period after the release of said corresponding control means, and second relay means under the control of said first relay means, said second relay means being operable upon the release of said corresponding control means to effect the activation of a second function at said recording apparatus.

7. In a remote-dictation system of the type including a centrally-located recording and reproducing apparatus connected over a plurality of wires to a group of remote dictator's instruments each having switch means for controlling current flow through said wires to effect at said recording apparatus the functions of backspacing and reproducing previously-recorded material; the combination of a carriage for said recording and reproducing apparatus; a backspacing mechanism for said carriage comprising an element mounted adjacent the path of movement of said carriage, said element normally being stationary but shiftable in a direction parallel to the path of movement of said carriage, controllable locking means to secure said carriage to said elements; first circuit means at said recording apparatus adapted to be coupled to one of said wires and responsive to the change in current therein produced by actuation of the corresponding switch at a dictator's instrument, said first circuit means being operable to actuate said controllable locking means; reverse drive means under the control of said first circuit means to shift said element in reverse direction when said locking means is actuated, thereby to effect a backspacing function at said recording and reproducing apparatus; and second circuit means responsive to the change in current in said one wire produced by the release of said corresponding switch, said second circuit means being operable to condition said recording and reproducing apparatus for a reproducing operation.

8. A backspacing mechanism for a dictating machine of the type having a carriage for producing relative advancing movement between a rotatable sound record and a transducing head cooperable with said record, said backspacing mechanism comprising a strip extending alongside the path of movement of said carriage, said strip being laterally flexible but longitudinally rigid, locking means actuable to secure said carriage to said strip at any selected point along said path of movement; a drum mounted for rotary movement, said strip being attached at one end to said drum to be wrapped thereabout as said drum is rotated, and motor means operable, when said locking means is actuated, to rotate said drum and thereby move said strip to pull said carriage back from its position of farthest advance to permit a playback of material recorded on said record.

9. For use with a dictating machine of the type having a carriage for supporting recording and reproducing transducers for relative advancing movement with respect to a rotatable sound record, drive apparatus for said carriage comprising movable means extending alongside the path of movement of said carriage, locking means actuable to secure said carriage to said movable means at any point along said path of movement; controllable backspacing means for shifting said movable means in reverse direction while said carriage is secured thereto, and spring means to pull said movable means and said carriage back to the position of farthest advance after a playback of material recorded on said record.

10. A backspacing mechanism for a dictating machine of the type having a carriage for producing advancing movement between a rotatable sound record and a transducing head co-operable with said record, said backspacing mechanism comprising a flexible metal strip extending along the path of movement of said carriage, said strip being normally stationary but shiftable in a direction parallel to said path of movement, locking means actuable to clamp said carriage to said strip at any point along said path of movement; reverse drive means operable, when said locking means is actuated, to shift said strip in reverse direction to pull said carriage back from its position of farthest advance to permit a playback of material recorded on said record; and forward drive means operable to pull said strip and said carriage towards the position of farthest advance.

11. A backspacing mechanism for a dictating machine of the type having a carriage for producing advancing movement between a rotatable sound record and a transducing head cooperable with said record, said backspacing mechanism comprising a flexible metal strip extending along the path of movement of said carriage, said strip being normally stationary but shiftable in a direction parallel to said path of movement; locking means actuable to clamp said carriage to said strip at any point along said path of movement, said locking means including a slide member bifurcated at one end to form a pair of elements closely adjacent each other and positioned on opposite sides of said strip, said elements being tapered so that the ends thereof are relatively wider, said slide member being mounted in a slideway arranged to force said elements together by a wedging action when said slide is shifted to move said elements towards the interior of said slideway, thereby to grip said strip between said elements; reverse drive means operable, when said locking means is actuated, to shift said strip is reverse direction to pull said carriage back from its position of farthest advance to permit a playback of material recorded on said record; and forward drive means operable to pull said strip and said carriage towards the position of farthest advance.

12. A dictating machine comprising, in combination, a rotatable record-supporting device, a record-cooperating translating device, a carriage for one of said devices mounted for travelling movement of said one device relative to the other device, means for advancing said carriage, a member extending along the path of movement of said carriage, locking means on said carriage and actuable to engage said member prior to a backspacing operation, pulse-type intermittent drive means for shifting said member in reverse direction in a step-by-step manner when said locking means is engaged, thereby to pull said carriage back from its position of farthest advance to permit a playback of the recorded material, and control means operable to activate said drive means to produce a backspacing step once each time the control means is operated.

13. A dictating machine comprising, in combination, a rotatable record-supporting device, a record-cooperating translating device, a carriage for one of said devices mounted for travelling movement of said one device relative to the other device, means for advancing said carriage, a member extending along the path of movement of said carriage, locking means on said carriage and actuable to engage said member prior to a backspacing operation, and pulse-type intermittent drive means for shifting said member in reverse direction in a step-by-step manner when said locking means is engaged, said drive means comprising a first pawl engageable with a first toothed pawl wheel drivably connected to said member, a second toothed pawl wheel, gear means connecting said pawl wheels together, a restraining pawl engageable with said second pawl wheel to prevent return movement of said member after a backspacing step, said gear means providing greater effective movement of said second pawl wheel than said first pawl wheel, whereby to improve the reliability of backspacing movement.

14. A dictating machine comprising, in combination, a rotatable record-supporting device, a record-cooperating translating device, a carriage for one of said devices mounted for travelling movement of said one device relative to the other device, means for advancing said carriage, a movably mounted member extending along the path of movement of said carriage, a clamping device on said carriage and actuable to engage said member prior to a backspacing operation, said clamping device including tapered wedge means on both sides of said member and adapted to be shifted longitudinally to apply high pressure laterally against said member; and means for moving said member in reverse direction when said clamping device is engaged, thereby to pull said carriage back from its position of farthest advance to permit a playback of the record.

15. A remote-dictation system of the type having a centrally-located recording machine operable by any one of a number of remote dictator's instruments; comprising a machine frame, a carriage movably mounted on said frame for effecting relative movement between recording and reproducing transducer means and a sound record; drive means at said recording machine response to the actuation of a first control at said remote instruments and arranged to advance said carriage for a recording operation; backspacing means responsive to the actuation of a second control at said remote instruments and arranged to move said carriage in reverse direction; return drive means for said carriage for pulling said carriage back to the position of farthest advance after a backspacing movement; and circuit means responsive to the actuation of said first control for activating said return drive means, whereby said carriage is shifted back to the position of farthest advance so that the dictator can quickly resume dictation after a reproducing operation.

16. A remote-dictation system of the type having a centrally-located recording machine operable by any one of a number of remote dictator's instruments; comprising a machine frame, a carriage movable mounted on said frame for effecting relative movement between recording and reproducing transducing devices and a sound record; drive means at said recording machine responsive to the actuation of a first control at said remote instruments and arranged to advance said carriage for a recording operation; backspacing means responsive to the actuation of a second control at said remote instruments and arranged to move said carriage in reverse direction, said backspacing means including a step-by-step pawl drive operable to backspace the carriage one increment each time said second control is operated; return drive means for said carriage including spring means connected between said carriage and said machine frame for pulling said carriage back to the position of farthest advance after a backspacing movement; a restraining pawl mechanism engageable during a backspacing operation to prevent forward movement of the carriage; and circuit means responsive to the actuation of said first control for disabling said restraining pawl mechanism so as to permit said carriage to be shifted back by said return drive means to the position of farthest advance.

17. A backspacing mechanism for a sound recording machine having a carriage for effecting advancing movement between a rotatable sound record and a transducing head cooperable with said record, said backspacing mechanism comprising an element mounted adjacent the path of movement of said carriage, said element normally being stationary but shiftable in a direction parallel to said path of movement; stop means for limiting the forward movement of said element; controllable locking means to secure said carriage to said shiftable element at any point along said path of movement; control means for shifting said stop means a small amount in a rearward direction while said locking means is de-actuated; reverse drive means operable, when said locking means is actuated, to shift said element in reverse direction to pull said carriage back from its position of farthest advance to permit a playback of material recorded on said record; said control means including means for returning said stop means to its normal forward position during a backspacing operation; and drive means for shifting said element forward to said stop means in the normal position thereof after playback has been completed, whereby the transducing head is prevented from recording on a previously-recorded part of the record.

18. A backspacing mechanism for a sound recording machine having a carriage for effecting advancing movement between a rotatable sound record and a transducing head cooperable with said record, said backspacing mechanism comprising a laterally-flexible strip extending alongside the path of movement of said carriage, a rotatable drum means having one end of said strip fastened to the periphery thereof, spring means secured to the other end of said strip to apply tension thereto; stop means for limiting rotation of said drum in the direction which moves said strip towards said spring means; controllable locking means to secure said carriage to said strip at any point along said path of movement; control means operable while said locking means is de-actuated for shifting said stop means a small amount in reverse direction with respect to advancing carriage movement; reverse drive means operable, when said locking means is actuated, to rotate said drum to shift said strip in reverse direction and thereby pull said carriage back from its position of farthest advance to permit a playback of material recorded on said record; said control means including means for returning said stop means to its normal position during a backspacing operation; said drum being rotatable at the end of playback to the normal stop position at which said carriage is slightly advanced relative to its position at the start of backspacing, whereby the transducing head is prevented from recording on a previously-recorded part of the record.

19. Dictation apparatus comprising, in combination, a rotatable record-supporting device, a record-cooperating translating device, a carriage for one of said devices mounted for travelling movement of said one device relative to the other device, means for advancing said carriage, backspacing means including a movably mounted member extending along the path of movement of said carriage, a stop device for limiting forward movement of said member, locking means on said carriage and actuable to engage said member prior to a backspacing operation, spring means normally urging said member against said stop device while said locking means is de-actuated; circuit means for shifting said stop device to the rear a small amount while said locking means is de-actuated prior to a backspacing operation; means for shifting said member in reverse direction when said locking means is engaged, thereby to pull said carriage back from its position of farthest advance to permit a playback of the record; and means for shifting said stop device to its normal forward position while said locking means is actuated, whereby said spring means will pull said carriage back to a position slightly forward of the carriage position at the time the backspacing operation was initiated.

20. In a remote-dictation system of the type including a centrally-located recording machine connected over a transmission line to a plurality of remote dictators' instruments each having on-off switch means for establishing a communication path to said recording machine, said machine including a record-supporting device and a record-cooperable translating device with a carriage for one of said devices mounted for travelling movement of said one device relative to the other, and having means for advancing and backspacing said carriage: apparatus for preventing the dictator from reproducing dictation placed on the record by a previous dictator, comprising, in combination; an elongated rod extending parallel to the path of movement of said carriage, bearing means on the frame of said machine to support said rod for longitudinal movement, spring means urging said rod in the direction of advancing movement of said carriage, disabling switch means mounted on said carriage and actuable by engagement with a forward end of said rod, said disabling switch means being operable when actuated to deactivate said backspacing means; locking means mounted on the frame of said machine, said locking means being shiftable into engagement with said rod to hold said rod in position against the urging of said spring means, and circuit means operable by said on-off switch means at the dictator's instruments, said circuit means serving to release said locking means prior to the start of a dictation operation and to actuate said locking means during the dictation operation, whereby said rod defines the position said carriage occupies at the start of dictation and deactivates the backspacing means if the dictator attempts to backspace the carriage beyond that position.

21. Apparatus as claimed in claim 20, wherein said locking means comprises a pivotally mounted arm arranged to bear against the surface of said rod and to frictionally hold it in place.

22. Apparatus as claimed in claim 20, including a solenoid for operating said pivotally mounted arm, and a spring connecting the armature of said solenoid to said arm.

23. Apparatus as claimed in claim 20, wherein said bearing means includes a hollow tubular member through which said rod extends, said spring means consisting of a coiled spring positioned about said tubular member and having one end secured thereto, the other end of said spring being fastened to a corresponding end of said rod to urge said rod end towards said tubular member.

24. In a remote-dictation system of the type including a centrally-located recording machine connected over a transmission line to a plurality of remote dictator's instruments each having an on-off switch for establishing a communication path to said recording machine, said machine including a record-supporting device and a record-cooperable translating device with a carriage for one of said devices mounted for travelling movement of said one device relative to the other, and having means for advancing and backspacing said carriage; apparatus comprising, in combination, means responsive to the operation of said on-off switch for defining the position of said carriage at the start of a dictation operation, means controlled by said defining means for rendering said machine inoperative to reproduce any recorded portion of the record back of said position, and circuit means responsive to the operation of said on-off switch to advance said carriage a predetermined amount prior to the start of a dictation operation, thereby to provide an isolating guard band of blank record between the material recorded by different dictators.

25. A remote-dictation system comprising a centrally-located recording machine connected over a transmission line to a plurality of remote dictator's instruments each having an on-off switch for establishing a communication path to said recording machine, said machine including a record-supporting device and a record-cooperable translating device with a carriage for one of said devices mounted for travelling movement of said one device relative to the other, means for advancing and backspacing said carriage, and circuit means responsive to the operation of said on-off switch to advance said carriage a predetermined amount prior to the start of a dictation operation, thereby to provide an isolating guard band of blank record between the material recorded by different dictators.

26. A remote-dictation system of the type having a centrally-located recording machine operable by any one of a number of remote dictator's instruments; comprising a machine frame, a carriage movably mounted on said frame for effecting relative movement between recording and reproducing transducers and a sound record; drive means at said recording machine responsive to the actuation of a first control at said remote instruments and arranged to advance said carriage for a recording operation; backspacing means responsive to the actuation of a second control at said remote instruments and arranged to move said carriage in reverse direction; return drive means for said carriage including spring means connected between said carriage and said machine frame for pulling said carriage back to the position of farthest advance after a backspacing movement; said backspacing means including restraining means for preventing the movement of said carriage in a forward direction during a backspacing operation; and circuit means responsive to the actuation of said first control for disabling said restraining means to permit said carriage to be shifted back by said return drive means to the position of farthest advance, whereby the dictator can quickly resume dictation after a reproducing operation.

27. Remotely-operated dictation apparatus comprising, in combination, a recording and reproducing machine controllable by a dictator's instrument connected thereto, said machine including a carriage for effecting relative movement between the recording and reproducing head means and a sound record; means for advancing said carriage; first circuit means responsive to a first control at the dictator's instrument to condition said machine for a recording operation with said carriage being driven forward by said advancing means; second circuit means responsive to a second control at the dictator's instrument to condition the machine for a backspacing operation; a movably mounted member extending along the path of movement of said carriage; locking means operable to engage said member with said carriage; backspacing means forming part of said second circuit means and arranged to operate said locking means and simultaneously shift said member in reverse direction a predetermined incremental distance each time said second control is actuated, thereby to permit said carriage to be shifted back in step-by-step fashion by successive actuations of said second control; and third circuit means responsive to the release of said second control, said third circuit means including time delay means operable a short time after release of said second control to condition said machine for a reproducing operation with said carriage being driven forward by said advancing means to play back previously recorded material.

28. Remotely-operated dictation apparatus comprising, in combination, a recording and reproducing machine controllable by a dictator's instrument connected thereto, said machine including a carriage for effecting relative movement between the recording and reproducing head means and a sound record; means for advancing said carriage; first circuit means responsive to a first control at the dictator's instrument to condition said machine for a recording operation with said carriage being driven forward by said advancing means; second circuit means responsive to a second control at the dictator's instrument to condition the machine for a backspacing operation; a flexible strip extending along the path of movement of said carriage; locking means operable to lock said carriage to said strip; a drum mounted for rotary movement, said strip being attached at one end to said drum to be wrapped thereabout as said drum is rotated in reverse direction; pulse-type intermittent backspacing means forming part of said second circuit means and arranged to operate said locking means and simultaneously rotate said drum in reverse direction a predetermined incremental amount each time said second control is actuated, thereby to permit said carriage to be shifted back in step-by-step fashion by successive actuations of said second control; and third circuit means responsive to the release of said second control, said third circuit means including time delay means operable a short time after release of said second control to condition said machine for a reproducing operation with said carriage being driven forward by said advancing means to play back previously recorded material.

29. Dictation apparatus comprising a rotatable record-supporting device, a transducing device cooperable with said record, said transducing device including means for recording dictation on said record and means for playing back previously recorded dictation, a carriage for one of said devices for producing travelling movement of said one device relative to the other device, means for advancing said carriage in a forward direction to permit recording or playback operation of said transducing device with the record, a movably mounted member extending along the path of movement of said carriage, said member having a smooth outer surface, locking means on said carriage actuable to secure said carriage to said movable member, said locking means including means to grip said smooth surface of said member in a pressure clamp to effect a frictional locking engagement therewith, power-operated means for shifting said member in a direction parallel to the direction of said travelling movement, and manually actuable carriage movement control means operable by the dictator to effect shifting movement of said carriage independently of said advancing means, said control means including means to actuate both said locking means and said power-operated means concurrently thereby to effect shifting of said carriage independently of said advancing means.

References Cited by the Examiner

UNITED STATES PATENTS

| | | | |
|---|---|---|---|
| 382,416 | 5/1888 | Edison | 274—21 |
| 2,816,177 | 12/1957 | Logan | 179—100.1 |
| 2,849,542 | 8/1958 | MacChesney | 179—100.2 |
| 2,855,205 | 10/1958 | Dinsmore | 274—21 |
| 2,864,891 | 12/1958 | Kobler | 179—100.1 |
| 2,961,243 | 11/1960 | Schueler | 274—21 |
| 3,007,705 | 11/1961 | Matusche | 274—21 |
| 3,031,530 | 4/1962 | Fleming | 179—100.1 |
| 3,094,590 | 6/1963 | Dervieux | 179—100.1 |

IRVING L. SRAGOW, *Primary Examiner.*

BERNARD KONICK, *Examiner.*